US00RE48918E

(19) United States
(12) Reissued Patent
Fälth et al.

(10) Patent Number: US RE48,918 E
(45) Date of Reissued Patent: Feb. 1, 2022

(54) POWER CABLE TERMINATION DEVICE FOR GAS-INSULATED SWITCHGEAR

(71) Applicant: NKT HV Cables AB, Lyckeby (SE)

(72) Inventors: Fredrik Fälth, Karlskrona (SE); Markus Saltzer, Fislisbach (CH); Christian Sonehag, Karlskrona (SE); Tomas Ahlberg, Rödeby (SE); Linus Adolfsen, Karlskrona (SE); Anders Lindgren, Karlskrona (SE)

(73) Assignee: NKT HV Cables AB, Lyckeby (SE)

(21) Appl. No.: 16/811,245

(22) Filed: Mar. 6, 2020

Related U.S. Patent Documents

Reissue of:
(64) Patent No.: 9,912,140
Issued: Mar. 6, 2018
Appl. No.: 15/120,059
PCT Filed: Feb. 19, 2014
PCT No.: PCT/EP2014/053240
§ 371 (c)(1),
(2) Date: Aug. 18, 2016
PCT Pub. No.: WO2015/124180
PCT Pub. Date: Aug. 27, 2015

(51) Int. Cl.
*H02G 15/22* (2006.01)
*H02B 1/46* (2006.01)
(Continued)

(52) U.S. Cl.
CPC ..... *H02G 15/22* (2013.01); *H02B 1/46* (2013.01); *H02G 15/06* (2013.01); *H02G 15/30* (2013.01); *H02G 15/064* (2013.01)

(58) Field of Classification Search
CPC ..... H02G 15/22; H02G 15/06; H02G 15/30; H02G 15/064; H02B 1/46; H02B 13/035
See application file for complete search history.

(56) References Cited

U.S. PATENT DOCUMENTS 3,634,603 A * 1/1972 Bentvelsen ..... H02G 15/06 174/73.1
3,721,002 A 3/1973 Pugh
(Continued)

FOREIGN PATENT DOCUMENTS

CN 1398449 A 2/2003
CN 101340074 A 1/2009
(Continued)

OTHER PUBLICATIONS

Canada Office Action Application No. 2,940,072 Completed: May 14, 2018 4 pages.
(Continued)

*Primary Examiner* — Kenneth Whittington
(74) *Attorney, Agent, or Firm* — Whitmyer IP Group LLC

(57) ABSTRACT

A power cable termination device for a high voltage direct current gas-insulated switchgear including: an outer housing made of an electrically conducting material, connectable to the switchgear; a terminal portion of a power cable, the power cable including an electrical conductor, a circumferential electrically insulating layer, and a circumferential conductive shield which is stripped off along a first part of the power cable; an electric field grading system including a resistive field grading material layer arranged circumferentially around the power cable to axially cover the edge of the conductive shield where the conductive shield is terminated, the resistive field grading material layer being in electrical contact therewith, and a connection device connectable to the gas-insulated switchgear and arranged to provide mechanical support and electrical contact with the gas-insulated switchgear.

11 Claims, 6 Drawing Sheets

(51) Int. Cl.

| | |
|---|---|
| ***H02G 15/06*** | (2006.01) |
| ***H02G 15/30*** | (2006.01) |
| ***H02G 15/064*** | (2006.01) |

(56) References Cited

U.S. PATENT DOCUMENTS

| | | | | | |
|---|---|---|---|---|---|
| 4,060,593 | A * | 11/1977 | Kazuo | C08F 10/00 | 423/492 |
| 4,228,318 | A * | 10/1980 | Selsing | H02G 15/22 | 174/143 |
| 4,431,859 | A | 2/1984 | Kishida | | |
| 4,431,861 | A * | 2/1984 | Clabburn | H02G 15/068 | 174/73.1 |
| 4,446,331 | A * | 5/1984 | Takaoka | H02G 15/003 | 174/73.1 |
| 8,525,025 | B2 * | 9/2013 | Li | H02G 15/068 | 174/73.1 |
| 8,609,987 | B2 * | 12/2013 | Li | H02G 15/068 | 174/19 |
| 8,754,329 | B2 * | 6/2014 | Li | H02G 15/184 | 174/144 |
| 8,946,552 | B2 * | 2/2015 | Li | H02G 15/064 | 174/142 |
| 2013/0075124 | A1 | 3/2013 | Li et al. | H02G 15/064 | 174/19 |
| 2013/0078836 | A1 | 3/2013 | Li et al. | H01R 9/05 | 439/198 |
| 2013/0081851 | A1 | 4/2013 | Li et al. | H02G 15/064 | 174/73.1 |
| 2013/0199816 | A1 | 8/2013 | Schops et al. | | |
| 2014/0069679 | A1 * | 3/2014 | Hoglund | H02G 15/02 | 174/73.1 |
| 2014/0182886 | A1 * | 7/2014 | Sonerud | C08L 23/12 | 174/120 SC |

FOREIGN PATENT DOCUMENTS

| | | | |
|---|---|---|---|
| CN | 201498284 | U | 6/2010 |
| CN | 101930818 | A | 12/2010 |
| CN | 102906954 | A | 1/2013 |
| CN | 103038965 | A | 4/2013 |
| DE | 19945148 | A1 * | 3/2001 |
| EP | 1774632 | B1 | 10/2007 |
| JP | H11512280 | A | 10/1999 |
| SE | 501342 | C2 | 1/1995 |
| WO | 2008119782 | A1 | 10/2008 |
| WO | 011144250 | A2 | 11/2011 |
| WO | 2011144250 | A2 | 11/2011 |
| WO | 2011144254 | A2 | 11/2011 |

OTHER PUBLICATIONS

European Search Report Application No. 14 705 201.3 Completed: Sep. 19, 2018 6 pages.

India Office Action Application No. 201647031559 Completed: Jun. 3, 2019 6 pages.

Korean Office Action and Translation Application No. 10 2016 7025746 dated Apr. 27, 2018 6 pages.

European Search Report Application No. 14 705 201 Completed: Feb. 8, 2018 6 pages.

Office Action from Canada Application No. 2,940,072 dated Aug. 23, 2017 4 pages.

CN Office Action and Translation Application No. 2014800759119.9 dated Jun. 1, 2017 10 pages.

International Search Report and Written Opinion of the International Searching Authority Application No. PCT/EP2014/053240 Completed: Sep. 9, 2014; dated Sep. 17, 2014 12 pages.

Japanese Office Action Application No. 2016-551747 Completed Date: Oct. 23, 2017; dated Oct. 31, 2017 7 Pages.

Korean Office Action Application No. 10-2016-7025746 dated Sep. 25, 2017 13 Pages.

International Preliminary Report on Patentability Application No. PCT/EP2014/053240 dated Aug. 23, 2016 8 pages.

CN Search Report Application No. 2014800759119.9 dated May 23, 2017 2 pages.

* cited by examiner

POWER CABLE TERMINATION DEVICE FOR GAS-INSULATED SWITCHGEAR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a 371 of International Patent Application No. PCT/EP2014/053240, filed on Feb. 19, 2014, which designates the United States. The present application is a Reissue of Patent Application of U.S. Pat. No. 9,912,140, issued Mar. 6, 2018. All prior applications are herein incorporated by reference.*

TECHNICAL FIELD

The technology disclosed herein relates generally to the field of electrical power cable terminations, and in particular to high voltage direct current gas-insulated switchgear cable terminations.

BACKGROUND

High Voltage Direct Current (HVDC) technology can be expected to play key part in future electrical grids. As the HVDC technology is maturing and the number of installed DC links increases, the need and demand for improved DC switchgears is likely to arise. A gas-insulated switchgear (GIS) has much reduced physical dimensions compared to more traditional open-air switchgear facilities and is likely to attract interest as a potential candidate for such improved DC switchgears, in particular as the GIS also has increased safety compared to the traditional switchgear facilities.

In order to connect a power cable to a GIS system a GIS cable termination is needed. For alternating current (AC) such terminations are available in a wide range of voltage levels. In contrast, for DC no such high voltage GIS cable terminations are available. The constrained dimensions of a GIS system make the realization of a robust GIS cable termination difficult, in particular in view of electrical phenomena unique for DC. For example, in comparison with cable terminations for AC applications, cable terminations for DC applications encounter more difficult electric fields and these cable terminations thus has to be designed in view of being able to cope with DC fields. In addition, there are general difficulties in increasing the transmission power for DC cable systems, e.g. requiring the DC solutions to be able to handle thermal issues resulting from higher currents leading to higher temperatures. The higher voltages also entail exposing the cable terminations to higher electric fields, which dramatically increases the risk of material breakdown.

Insulation and mechanical performances are also important when designing cable terminations and the electric field has to be controlled carefully on various critical locations.

Currently available DC cable terminations are free-standing in air and either comprises solid/rubber materials at lower voltages, or fluid-filled/porcelain insulators at increased voltages. Free-standing DC terminations require a large footprint due to long flashover distances in air.

SUMMARY

FIG. 1 is provided to further describe the difficulties involved when developing GIS cable termination devices for HVDC applications. FIG. 1 is highly simplified illustration, provided to illustrate the mentioned difficult electric fields. The GIS system, typically having a grounded housing, could be made much smaller than the traditional switchgear system. In the FIG. 1, the leftmost part illustrates equipotential lines for the electric field created in a GIS chamber and the rightmost part illustrates equipotential lines for the electric field created in a traditional termination device. Looking first at the rightmost part; in the traditional termination device, there is an electric potential difference between the upper part (high voltage) of the termination device and the lower part (grounded), hence the illustrated equipotential lines. In contrast, the housing of the GIS chamber is grounded, i.e. no electric potential difference, hence the illustrated equipotential lines for this case (refer to the leftmost part of the FIG. 1). The difficult electric fields referred to earlier thus comprise e.g. the difficulties in that the equipotential lines are being kept more or less parallel and close together, and the electric field thus being much higher than for the traditional terminal device, wherein the equipotential lines separates, i.e. the electric field decreases. When designing a cable termination device for GIS, this has to be handled, e.g. in view of avoiding increases in electric field in the insulating media (e.g. gas) causing breakdown.

There are thus several difficulties or problems involved when developing HVDC GIS cable terminations. Firstly there are electrical difficulties, e.g. the above issue described in relation to FIG. 1. Further, at the termination of a power cable outer screen (also denoted semicon edge) high electric fields are typically seen at different locations, e.g. in the solid materials, along interfaces between different materials and components, in locations where three components or layers interfaces each other (such locations also known as triple points) and in the insulating material surrounding the conductor of the power cable, and there is also an increased electrical field in insulating media, such as e.g. oil or gas, within the cable termination.

Furthermore, in DC applications, charge build-up at these interfaces between different materials and components is a serious problem and the electric field has to be carefully controlled, particularly in various critical locations, such as the above mentioned locations.

Secondly there are thermal difficulties. The constrained geometry of the GIS cable termination may enhance local heating, which in turn may lead to thermal breakdown of the power cable.

Thirdly there are mechanical difficulties. A mechanical connection between the GIS system and the GIS cable termination must be able to provide good electrical contact at various operation temperatures. Further, it must be solid enough to withstand handling and provide mechanical support to sensitive parts. Further still, the termination must be adequately pressure sealed between different compartments and also to atmospheric pressure.

An object of the present disclosure is to solve or at least alleviate at least one of the above mentioned problems.

The object is according to a first aspect achieved by a power cable termination device for a high voltage direct current gas-insulated switchgear. The power cable termination device comprises an outer housing made of an electrically conducting material. The outer housing is fixedly connectable at first end thereof to the high-voltage direct current gas-insulated switchgear. The power cable termination device further comprises a terminal portion of a power cable the power cable comprising an electrical conductor, an electrically insulating layer circumferentially surrounding the electrical conductor, and a conductive shield circumferentially surrounding the insulating layer and the electrical conductor, wherein the conductive shield is stripped off along a first part of the power cable; an electric field grading system comprising a resistive field grading material layer arranged circumferentially around the power cable such as to extend axially at least along a part of the electrically insulating layer and such as to cover the edge of the conductive shield where the conductive shield is terminated, the resistive field grading material layer being in electrical contact therewith. The power cable termination device further comprises a connection device connectable to the gas-insulated switchgear and arranged to provide mechanical support and electrical contact with the gas-insulated switchgear.

The provided power cable termination allows for a HVDC cable to terminate directly inside a DC GIS system. By providing an electrical field grading system adapted to handle DC specific phenomena occurring in such GIS systems, electrical difficulties related to the providing of HV DC GIS cable terminations are overcome. The power cable termination is able to handle DC specific requirements, while still meeting a general desire of reduced size.

In an embodiment, the electric field grading system comprises an electric field control member arranged circumferentially surrounding the resistive field grading material layer at least along a part thereof, the electric field control member being arranged to control electrical field along the length of the power cable.

In a variation of the above embodiment, the electric field control member comprises a resistive field grading material.

In a variation of the above embodiment, the resistive field grading material of the electric field control member and the resistive field grading material of resistive field grading material layer is a non-linear resistive field grading material. The resistive field grading material layer and the electric field control member may be manufactured as a single device, providing a cost-efficient solution and avoiding an electrical interface between the resistive field grading material layer and the electric field control member. The resistive field grading material of the resistive field grading material layer and the electric field control member, respectively, may be chosen to have same electrical properties, i.e. comprise of same field grading material. In other embodiments, the resistive field grading material of the resistive field grading material layer and the electric field control member, respectively, may be chosen to have different electrical properties.

In an embodiment, the power cable termination device comprises an inner shell made of an electrically insulating material and fastened at a first end thereof to the connection device and at a second end thereof to a power cable receiving part of the outer housing. The inner shell provides mechanical support during installation and operation and also enables the use of different insulating media to be used, i.e. a first media closest to the power cable and another outside of the inner shell.

In a variation of the above embodiment, the inner shell is fastened at the first end thereof to the connection device via a first metal plate, and wherein the inner shell is fastened at the second end thereof to the outer housing via a second metal plate. Such embodiment achieves a cost reduction in that the same inner shell may be used for various applications.

In a variation of the above embodiment, the first metal plate and the second metal plate comprise a number of holes, through which an insulating medium can pass. This embodiment provides an increased circulation of the insulating medium, enabling an improved cooling of the power cable.

In an embodiment, the inner shell comprises a number of holes. A further still improved circulation of the insulating medium is thereby enabled.

In an embodiment, the resistive field grading material layer is made of a non-linear resistive field grading material. The non-linear resistive field grading material adapts to the changing stresses created in the HVDC GIS and is dynamic in that the conductivity increases at locations in which the electric field becomes high, i.e. the conductivity is a function of the electric field. Thereby DC specific electrical difficulties are handled.

In an embodiment, the electric field grading system comprises a conducting electrode fastened to a second end of the outer housing circumferentially surrounding the power cable and arranged a distance from the resistive field grading material layer. The conducting electrode provides geometric field control and a field-enhancement created at the edge where the conductive shield is cut off are avoided or at least mitigated.

In an embodiment, the housing comprises grounding means for being grounded in use. This is the typical use case.

The object is according to a second aspect achieved by a high-voltage direct current gas-insulated switchgear system comprising high-voltage direct current gas-insulated switchgear and a power cable termination as above.

Further features and advantages of the present disclosure will become clear upon reading the following description and the accompanying drawings.

DETAILED DESCRIPTION

Figure 1:
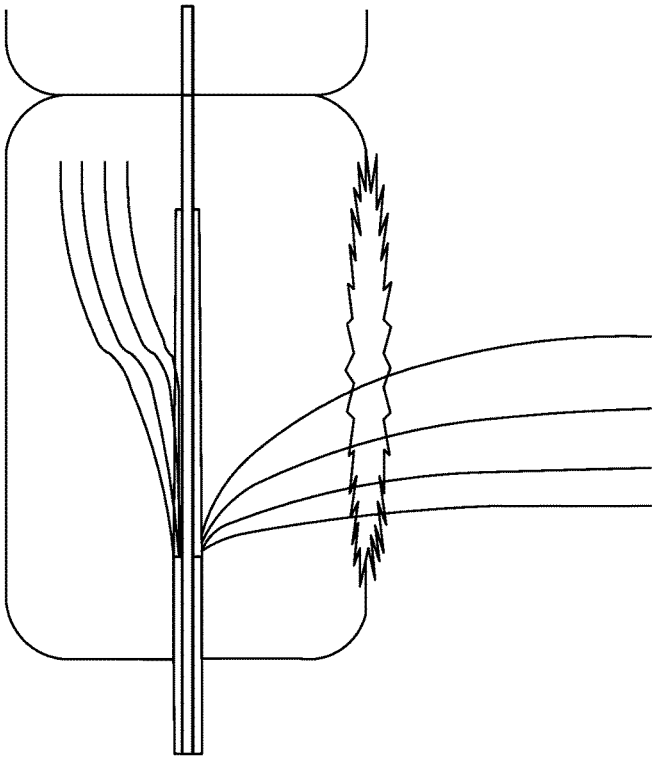
FIG. 1 illustrates a cable termination in accordance with the invention.

In the following description, for purposes of explanation and not limitation, specific details are set forth such as particular materials, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present disclosure provides in various aspects a HVDC cable termination design for GIS.

Figure 2:
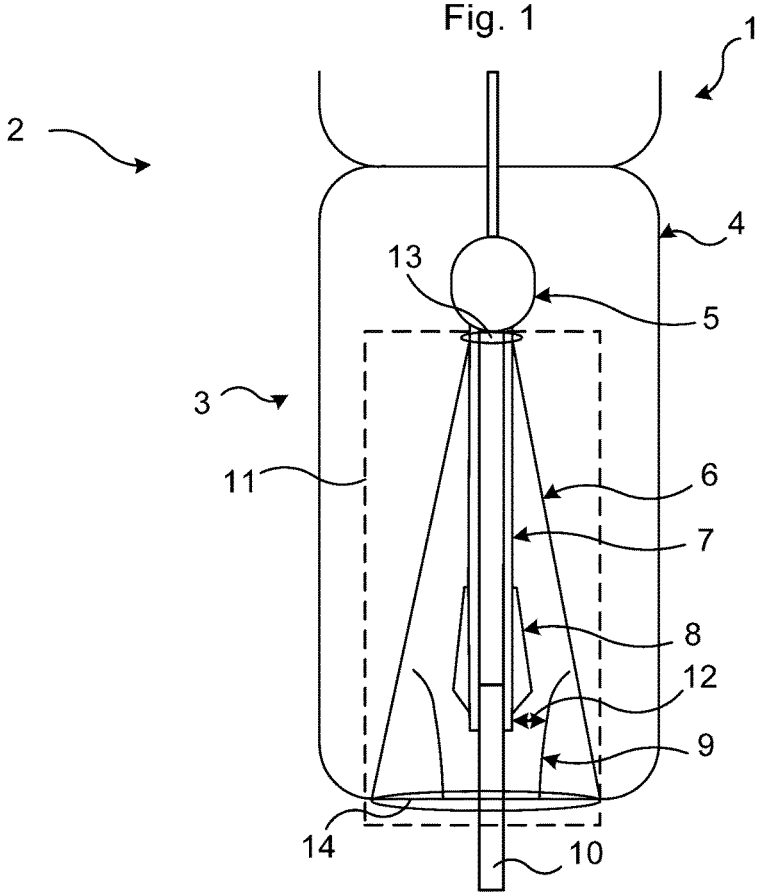
FIG. 2 illustrates an embodiment of the cable termination of FIG. 1.

FIG. 2 illustrates a cable termination in accordance with an embodiment of the present disclosure. A power cable 10 is to be connected to a gas-insulated switchgear 1. The power cable 10 may be a cable such as the power cable described with reference to FIGS. 8A and 8B. In FIG. 2, part of such gas-insulated switchgear (GIS) 1 is illustrated. The GIS 1 may be a conventional switchgear facility comprising for example switches, busbars, transformers etc. (not illustrated).

A GIS termination chamber 3 (also denoted a power cable termination device 3 herein) is connectable to the GIS 1. The GIS termination chamber 3 comprises a housing, in the following denoted outer shell 4, which is fixed to the GIS 1. The outer shell 4 provides mechanical support for an electric field grading system 11 and also separation from an atmosphere outside the outer shell 4. The outer shell 4 comprises an electrically conductive housing, e.g. being made of an electrically conducting material. The outer shell 4 may comprise means for being grounded in use, which is the typical use case.

A GIS system 2, as the term is used in the present disclosure, comprises the GIS 1 and the GIS termination chamber 3.

The GIS termination chamber 3 comprises, within the outer shell 4, the electric field grading system 11, a connection device 5 for connecting the electric field grading system 11 to the GIS 1 and a termination part of a power cable 10. The connection device 5 may be an electrically shielded mechanical connection providing electrical contact and mechanical support. The connection device 5 should be designed in view of the being able to handle the electric field as described in relation to FIG. 1. The connection device 5 may for example be provided with field control devices that are designed so as to be able to handle such electric fields.

The connection device 5 may designed in view of rendering an installation easier, in particular when the electric field grading system 11 has been assembled ex-situ and is thereafter installed into the GIS termination chamber 3. Examples of such design aspect comprise the connection device 5 being e.g. a female connector to be attached to a corresponding male connector arranged at the GIS 2, or the other way around, i.e. the connection device being a male connector while the corresponding female connector arranged at the GIS 1. The use of a guide pin or the like may further facilitate the installation. Providing the connection device 5 with contact springs for electrical connection between such male and female connectors enable a secure electrical contact by the flexibility of springs; the flexibility compensating for differences in volume of the components caused by temperature changes.

The connection device 5 overcomes at least some of the earlier mentioned mechanical difficulties by providing good electrical contact at various operation temperatures. In an embodiment, at least a first (upper) part of the connection device 5 is made of a material with high electrical and thermal conductivity, e.g. a metal, with a rather large surface area. The first part being made of metal and having a large surface area towards the surrounding cooling medium, e.g. gas, enables such cooling.

It is noted that the connection device 5 may include further components, e.g. fitting sleeves, sealing sleeves etc.

Figure 8A:
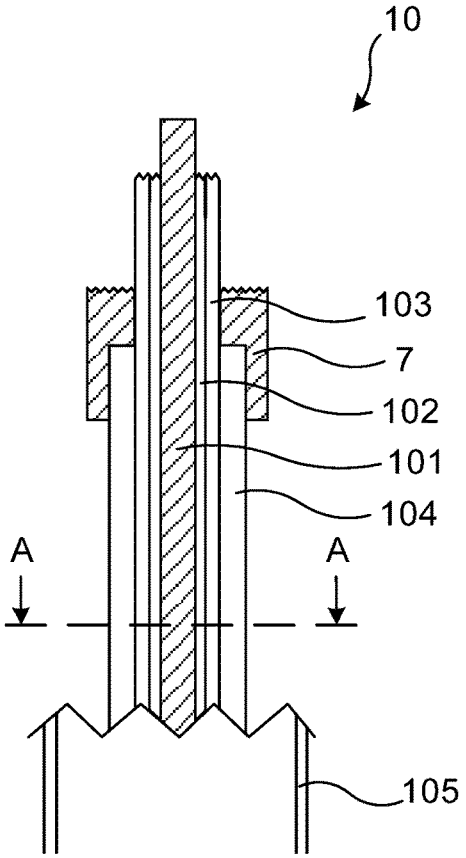
FIGS. 8A and 8B illustrate in different views a power cable termination of FIG. 7.
Figure 8B:
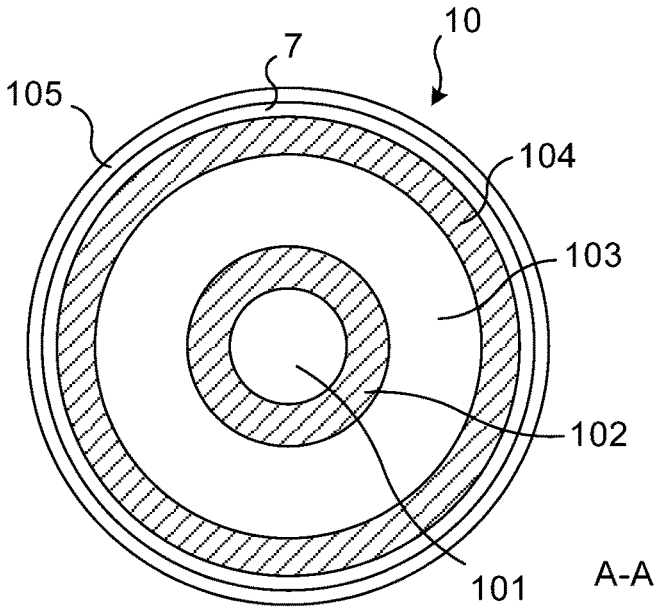

Turning briefly to FIGS. 8A and 8B, illustrating a power cable, and in particular the termination thereof, which will be described next. FIG. 8A illustrates a power cable 10, and FIG. 8B is a cross-section view along line A-A of FIG. 8A and it is noted that the relative thicknesses of the various layers may differ from an actual power cable. As illustrated in FIG. 8B, the power cable 10 comprises at least an inner electrical conductor 101, e.g. made of copper and comprising e.g. a number of stranded conductors, an electrically insulating layer 103 circumferentially surrounding the electrical conductor 101, and a conductive shield 104 (also denoted outer semicon), which circumferentially surrounds the electrically insulating layer 103 and the electrical conductor 101. The conductive shield 104 may be connected to ground and arranged to equalize dielectric stress on the insulating layer 103. The power cable 10 also comprises an electrically insulating outer jacket 105. As indicated in the FIG. 8B, there may be further layers as well. For instance, there is typically an inner screen 102 between the electrical conductor 101 and the electrically insulating layer 103, i.e. such inner screen 102 (also denoted inner semicon) circumferentially surrounds the electrical conductor 101, and is circumferentially surrounded by the electrically insulating layer 103. As a particular example of insulation layer material, cross-linked polyethylene (XLPE) can be mentioned. Still other layers may also be present, e.g. a layer of metal armoring.

When electrically connecting the power cable 10 to the switchgear, or more generally to other electric equipment, the power cable 10 is cut off (terminated) and all layers are stripped off in order to expose the conductor 101, from the cut off end and along a first length. Along this first length, the termination end of the power cable 10 thus comprises only the exposed conductor 101. Thereby the conductor 101 may be connected to electric equipment, which in the present disclosure may comprise a receiving end of the gas-insulated switchgear 1. Further, the power cable 10 is partly stripped off along a second length thereof (following the first length of exposed conductor 101), in particular down to the electrically insulating layer 103. This partial stripping along the second length results in a disruption of the geometry of the power cable 10, that is, a geometry change at a section between the end of the second length of exposed electrically insulating layer 103 and the conductive shield 104 (outer semicon). In this geometry disruption, i.e. at the (outer) semicon edge, there will be a substantial stress concentration if not taken care of, in particular high electric field and electric field stress. At the termination of the conductive shield 104 (the outer semicon), i.e. where the conductive shield 104 ends and a circumferential edge (also denoted semicon edge) is formed, there is a particularly high electric field and electric stress. To alleviate such electric fields and field stress, a field grading material (FGM) layer 7 is arranged to circumferentially surround the semicon edge of the power cable 10, i.e. to surround the edge of the conductive shield 104. This efficiently controls the electric field distribution and reduces the electric field stress. In the FIG. 8A, the FGM layer 7 is illustrated as covering the edge (semicon edge) between the part of the power cable 10 where the conductive shield 104 has been stripped off to the part of the power cable 10 which is still shielded, i.e. where the conductive shield 104 is present. Although illustrated as ending close to the disrupted conductive shield 104 (semicon edge), the FGM layer 7 may typically be arranged to cover the electrically insulating layer 103 along its entire axial length.

Reverting to FIG. 2, in this embodiment the electric field grading system 11 is mounted within an inner shell 6. The electrical field grading system 11 is in particular arranged to handle electrical difficulties arising for HVDC GIS cable terminations, and comprises at least a resistive field grading layer, in particular a field grading material (FGM) layer 7 (compare FIG. 8A). The FGM is preferably a non-linear resistive FGM that changes its resistance dependent on the electric field. The present disclosure thus provides a solution for handling electrical difficulties arising when providing a cable termination for a HVDC GIS. The non-linear resistive FGM adapts to the changing stresses created in the DC application (in particular the HVDC GIS application), and can be seen as a dynamic electric stress grading system. The resistive non-linear field grading material may also respond dynamically to voltage impulse shapes by adapting the conductivity in a non-linear way to the electric field stress experienced. A field control member 8, described more in detail later, may be provided, which may handle such impulses (i.e. fast and high impulses where the FGM response may not suffice), while the FGM layer 7 may be provided to handle lower and slower impulse voltages. The non-linear resistive material is dynamic in that the conductivity increases at locations in which the electric field becomes high, i.e. the conductivity is a function of the electric field.

As mentioned earlier, the FGM layer 7 is arranged to cover the semicon edge (compare FGM layer 7 covering the edge of the conductive shield 104 of FIG. 8A). That is, the FGM layer 7 is arranged around the conductive shield (compare reference numeral 104 of FIG. 8B) of the power cable 10 and in electric contact with the conductive shield 104. The FGM layer 7 thereby connects high voltage on the top connection to ground, the conductive shield 104 being grounded. It is noted that in some embodiments, the FGM layer 7 is arranged around the conductive shield along a certain axial length thereof, but not all the way to the top connection. The FGM layer 7 may be adapted in view of the particular application at hand by varying its thickness along the length thereof and/or by adapting the FGM to have a desired electric conductivity to meet the expected electrical field stresses of the particular application. The FGM may be characterized in different ways. The conductivity of the non-linear FGM depends on the electric field and varies greatly, in particular to a much larger extent than other materials. The FGM has a field-dependent conductivity that may increases strongly from a low conductivity value to a high conductivity value, i.e. changes from being highly insulating (high resistance) to being highly conductive (low resistance). As a particular, non-limiting example the FGM may have a conductivity in the region of $10^{-16}$ or $10^{-14}$ Siemens per meter (S/m) in case of being exposed to a low electric field, and change to have a conductivity in the region of $10^{-3}$ S/m or 0.1 S/m in case of being exposed to a high electric field. The FGM may for example comprise e.g. SiC and/or ZnO and/or carbon black filled polymers, and the characteristics of the FGM may be designed to comprise a certain conductivity. The FGM may also be designed to have a permittivity (also denoted dielectric constant) set in view of obtaining some capacitive field grading, e.g. by choosing filler material and concentration of the chosen filler material accordingly.

Figure 9:
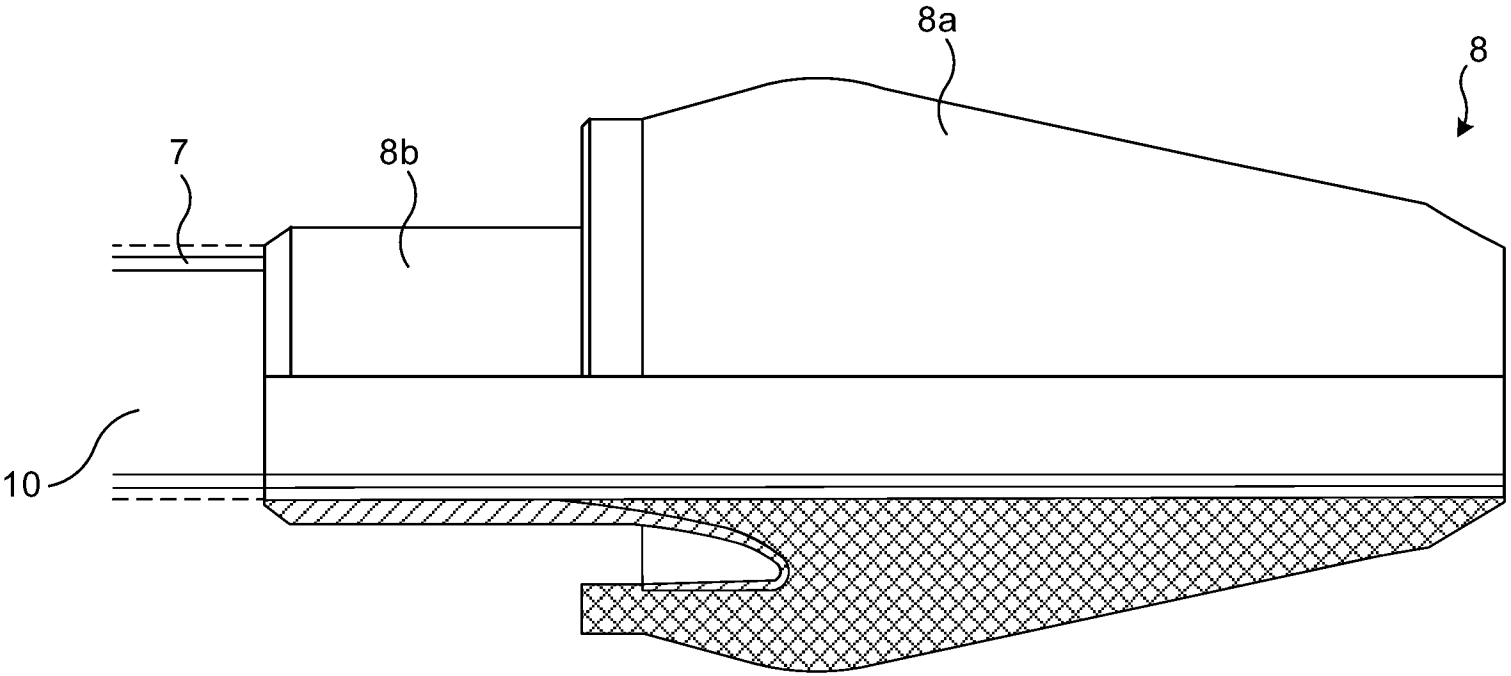
FIG. 9 illustrates a stress cone of the cable termination of FIG. 1.

The electrical field grading system 11 may further comprise an electric field control member 8, also denoted stress cone. The stress cone 8 is arranged surrounding the FGM layer 7, as illustrated schematically in e.g. FIG. 2. The stress cone 8 is illustrated more in detail in FIG. 9, showing the stress cone 8 in a side view partly in section. The stress cone 8 is arranged to provide geometrical, resistive and/or capacitive field control, and comprises e.g. insulating or stress-grading rubber combined with conducting or semiconducting rubber. The conducting or semiconducting rubber part of the stress cone, indicated at reference numeral 8b, may have the shape of a cylinder at a first end thereof and be arranged around the power cable 10 along this end, and in particular surrounding the FGM layer 7. The semiconducting rubber part 8b may at a second end thereof deviate from the cylinder form, and instead follow the surface of the insulating rubber part. The insulating rubber part 8a of the stress cone 8, which is indicated at reference numeral 8a may for example have an essentially cone-shaped form, the form being adapted for the application at hand.

The electrical field grading system 11 may further comprise a metallic or conducting electrode 9 placed a certain distance away from the FGM layer 7. The conducting electrode 9 may be fastened to the outer housing, and in particular to the power cable receiving end (in the figures, illustrated as the lower end). The conducting electrode 9 may be arranged to circumferentially surround the power cable and arranged a distance from the resistive field grading material layer 7. It is noted that the conducting electrode may be fastened elsewhere within the outer housing, such as e.g. fastened to the power cable or fastened to the (vertical) walls of the outer housing. In embodiments comprising both the stress cone 8 and the conducting electrode 9, there is a distance between these devices as well, i.e. the conducting electrode 9 is arranged also a distance away from the stress cone 8.

The electrode 9 is denoted screening electrode and provides geometric field control and by placing the screening electrode 9 a distance (e.g. a few centimeters, as a particular example about 5-10 cm may be mentioned) away from the FGM layer 7, a field-enhancement at the triple point is avoided; the most critical triple points being created at the semicon edge: FGM layer 7/part of the power cable with conductive shield/part of power cable without conductive shield (i.e. cable insulation layer) and at FGM layer 7/semiconducting rubber of the stress cone 8/insulating material of the stress cone 8. It is noted that there are additional triple points as well. The gap between the FGM layer 7 and the screening electrode is indicated at reference numeral 12 in FIG. 2.

The electrical field grading system 11, comprising the above mentioned FGM layer 7, and optionally the stress cone 8 and/or the conducting electrode 9, is designed to overcome one or more of the earlier indicated electrical difficulties involved when developing HVDC GIS cable terminations. The high electrical fields are reduced to great extent by the FGM layer 7, which may be adapted in view of the application at hand, for example by adapting the thickness thereof. The FGM layer 7 provides resistive field grading of the electrical field, and the electrical properties of the FGM may be chosen so that the electrical field becomes distributed within the material and spread over a larger region, whereby the electric stress is greatly reduced. A non-linear FGM exhibits a non-linear electrical resistance that decreases with an increasing electric field. Typically, the closer the semicon edge, the higher the electric field is in the FGM layer 7. By using non-linear FGM layer 7, the voltage drop along the FGM layer 7 will be more uniformly distributed in the axial direction since the electrical resistance in the FGM layer 7 will decrease with increasing electric field. The high electrical fields at the semicon edge, seen in the solid materials, along interfaces between different materials and components, in locations where three components or layers interfaces each other (such locations also known as triple points) and in the insulating material surrounding the conductor of the power cable, are thereby handled.

Still with reference to FIG. 2, the GIS termination chamber 3 further comprises, in various embodiments, the earlier mentioned inner shell 6. The inner shell 6 is, when installed and in use, in direct contact with high voltage and ground, and it is therefore made of an electrically insulating material, e.g. composite isolant. The inner shell 6 is preferably a composite insulator owing to the low weight thereof, but it is noted that other materials may be used, for example porcelain. The inner shell 6 is arranged to provide mechanical support during installation and operation. In particular, the electric field grading system 11 may, as mentioned earlier, be assembled ex-situ and thereafter be installed into the GIS termination chamber 3, and the inner shell 6 provides mechanical support during such installation and thereby also facilitates the installation.

The inner shell 6 further serves as a pressure barrier between the electrical field grading system 11 and the outer shell 4. The inner shell 6 thereby enables the use of different insulating media within the inner shell 6 and in the volume between the outside of the inner shell 6 and inside the outer shell 4, and also at different pressures. The inner shell 6 may be designed in view of handling such pressure differences, by e.g. adapting the thickness of the inner shell 6 to handle such pressure differences.

The respective volumes (or chambers) created by the outer shell 4 and the inner shell 6 may be hermetically sealed from each other, as well as from the GIS 1, and the insulating medium within the inner shell 6 and the insulating medium in the above mentioned volume may thus be chosen independently. For practical purposes, the outer shell 4 may be filled with the same insulation medium as the GIS 1, and $SF_6$ (Sulfur hexafluoride) gas is preferably used owing to its high insulation strength, low weight and easy handling. Although depending on the application at hand, the insulation medium of the inner shell 6 (i.e. within the volume mentioned above) may be different than the insulation medium outside the inner shell 6. The GIS termination chamber is, according to various embodiments of the present disclosure, advantageous in that it may thereby easily be adapted for use with oil or with gas. The insulation medium of the inner shell 6 may for example be $SF_6$ or oil. Oil has good thermal properties and is able to transfer heat to a higher degree than $SF_6$.

The inner shell 6 is also arranged to center and keep the power cable 10 stretched.

The inner shell 6 may have a cone-shaped form, in particular having the shape of a cut-off cone with a first diameter at a first end (in the FIG. 2, its uppermost end), the first end being fastened to the connection device 5, i.e. mechanically connected thereto, and a second diameter at a second end (in the FIG. 2, its lower end), the second end of the inner shell 6 e.g. being connected to the outer shell 4 at an entrance part for the power cable 10. The first diameter may thus be smaller than the second diameter. The inner shell 6 may be fastened at the first end thereof (in the FIG. 2, its upper end) to the connection device 5 and at an opposite end, i.e. the second end thereof (in the FIG. 2, its lower end) to the outer shell 4, in particular to a power cable receiving part, i.e. the part where the power cable enters the outer shell 4. However, in another embodiment, the inner shell 6 is arranged on metal plates, in particular fastened at its first end to a first metal plate (in the figure, upper end), indicated at reference numeral 13, and at its second end to a second metal plate (in the figure, lower end), indicated at reference numeral 14. The first (upper) metal plate 13 is then fastened to the connection device 5, and the second (lower) metal plate 14 is fastened to the part of the outer shell 4 wherein the power cable 10 enters the outer shell 4. Such embodiment enables the use of same inner shell 6 for different embodiments, as will be described later, requiring only the metal plates 13, 14 to be adapted to the different embodiments. Although the inner shell 6 is described and illustrated as having a cone-shaped form, other forms are also possible, e.g. a cylinder shaped inner shell. It is also noted that the inner shell 6, when having the shape of a cut-off cone, could be arranged in the opposite way to the one described above. That is, the second diameter could be smaller than the first diameter.

In a further aspect, the inner shell 6 may be adapted to handle thermal issues as well as electrical issues by designing the inner shell accordingly. In particular, angles of the inner shell when having the shape of a cone or cut-off cone may be varied so as to avoid "hotspots" (i.e. volumes/areas within increased temperature), the angles referring to the angles between the walls of the inner shell and a vertical line. Thus, the radiuses (/diameter) of the upper first part and the lower second part of the inner shell may be increased or decreased in view of improving thermal convection so that the end of the power cable 10 is cooled to a larger extent and "hotspots" are avoided. This choosing of diameter corresponds to increasing or decreasing the angle between the power cable 10 and the inner shell 6, wherein an acute angle typically entails an enhanced risk of hotspots being created.

In another aspect, the design of the inner shell 6 may be adapted in view of electric breakdown. In particular, the inner shell 6 provides two interfaces, where different media meet: the interface between the gas and the outside of the inner shell 6, and the interface between the inside of the inner shell 6 and the gas. There is a risk of interfacial breakdown at both these interfaces, which breakdown risk may be reduced by adapting the mentioned angle and/or shape of the inner shell so as to minimize the part of the electric field that causes this type of breakdown.

Figure 3:
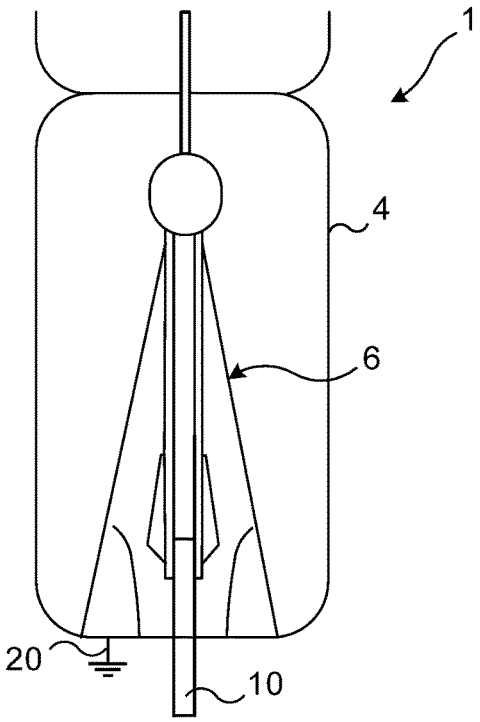
FIG. 3 illustrates an embodiment of the cable termination of FIG. 1.

FIG. 3 illustrates an embodiment of the present disclosure. In this embodiment, the inner shell 6 is hermetically sealed and filled with oil. Oil cools the power cable 10 more efficiently than SF6, and since the power cable 10 may be heated substantially when providing high currents, this embodiment is advantageous in applications in which temperature control is important. The housing 4 may also comprise grounding means 20 for being grounded in use. Although not shown in FIGS. 2 and 4-7 for simplicity, each of the housings 4 therein may comprise grounding means 20 to provide grounding.

Figure 4:
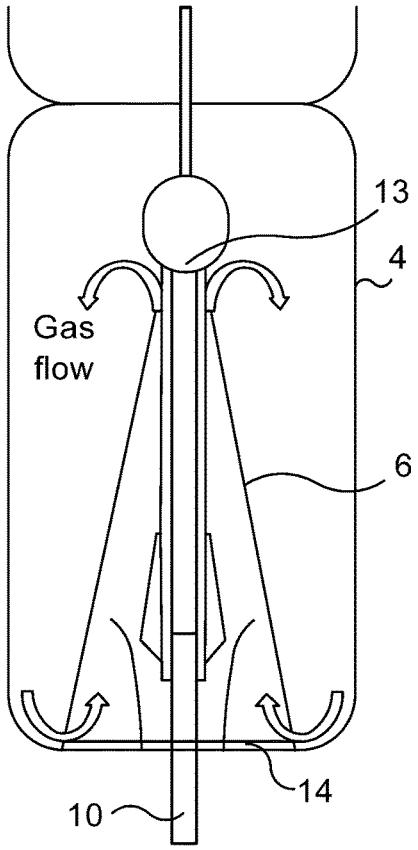
FIG. 4 illustrates an embodiment of the cable termination of FIG. 1.

FIG. 4 illustrates an embodiment of the present disclosure. In this embodiment, the inner shell 6 is filled with $SF_6$ or another gas. Gas may be allowed to circulate between the space within the inner shell 6 and the space outside the inner shell 6 (i.e. space between the inner shell 6 and the outer shell 4). Such gas circulation may be accomplished by designing the inner shell 6 with holes. In another embodiment, the inner shell 6 has no holes, and the gas is instead circulated by connecting the inner shell 6 and the outer shell 4 to each other by the earlier mentioned upper metal plate 13 and a lower metal plate 14, which are provided with holes. The gas then flows into the space within the inner shell 6 through the holes of the lower metal plate 14 and exits the same space through the holes of the upper metal plate 13. The arrows in FIG. 4 indicate a gas flow according to the latter embodiment. The gas within the inner shell 6 closest to the power cable 10 is heated (by increased temperature of the power cable 10 at high currents) to a larger extent than the gas in the space outside the inner shell 6. The circulation of the gas thereby provides a better cooling of the power cable 10 by circulating the warmer gas within the inner shell 6 to the larger space outside the inner shell, which also has gas having lower temperature, which low temperature gas is thus circulated to within the inner shell 6.

One or more of the earlier indicated thermal difficulties involved when developing HVDC GIS cable terminations is overcome by the above embodiments. In particular, enhanced local heating, which in turn may lead to thermal breakdown of the power cable, may be avoided.

Figure 5:
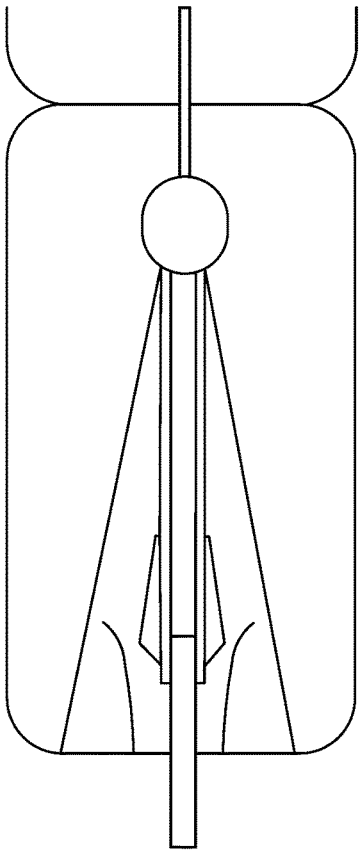
FIG. 5 illustrates an embodiment of the cable termination of FIG. 1.

FIG. 5 illustrates an embodiment of the present disclosure. In this embodiment, the stress cone 8 is made of stress-grading material, and in particular the insulating rubber part of the stress cone 8a (refers to earlier description of the stress cone 8 and FIG. 9). The stress-grading material may for example be non-linear resistive FGM. The FGM layer 7 and the stress cone 8 may thus both comprise non-linear resistive FGM. The respective FGM may have same or different electrical properties, e.g. having same or different dielectric constants. For the FGM layer 7, arranged closer to the power cable 10 than the stress cone 8, a material having higher electrical conductivity (lower resistivity) may be chosen than the FGM of the stress cone 8. The FGM layer 7 and the stress cone 8 may be manufactured as an integrated body made of FGM. One electric interface may thereby be omitted, i.e. such stress cone 8 avoids a triple point to be formed in an electrically sensitive part of the electric field grading system 11. One or more of the earlier indicated electrical difficulties involved when developing HVDC GIS cable terminations is thus overcome also by such embodiment. In particular, by using same material for the stress cone 8 and the FGM layer 7, difficulties relating to charge build-up are avoided. That is, the use of same material in effect eliminates one electrical interface between components conventionally being of different material and thus having different material properties, i.e. the interface between the stress cone 8 and the FGM layer 7, avoids corresponding high electrical fields.

Figure 6:
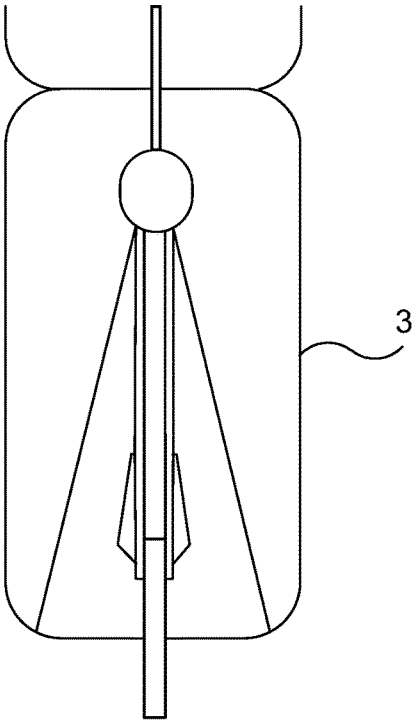
FIG. 6 illustrates an embodiment of the cable termination of FIG. 1.

FIG. 6 illustrates an embodiment of the present disclosure. In this embodiment, the screening electrode 9 (refer e.g. to FIG. 2) is omitted. Depending on the requirements of the GIS termination chamber 3 and material characteristic of the FGM layer 7, the screening electrode 9 may be omitted from any of the described embodiments.

The embodiments described thus far have been illustrated as comprising the inner shell 6, which in turn comprises the electric field grading system. The installation of the electric field grading system 11 within the inner shell 6 has advantages such as the inner shell 6 providing mechanical support and protection of the electric field grading system 11.

Figure 7:
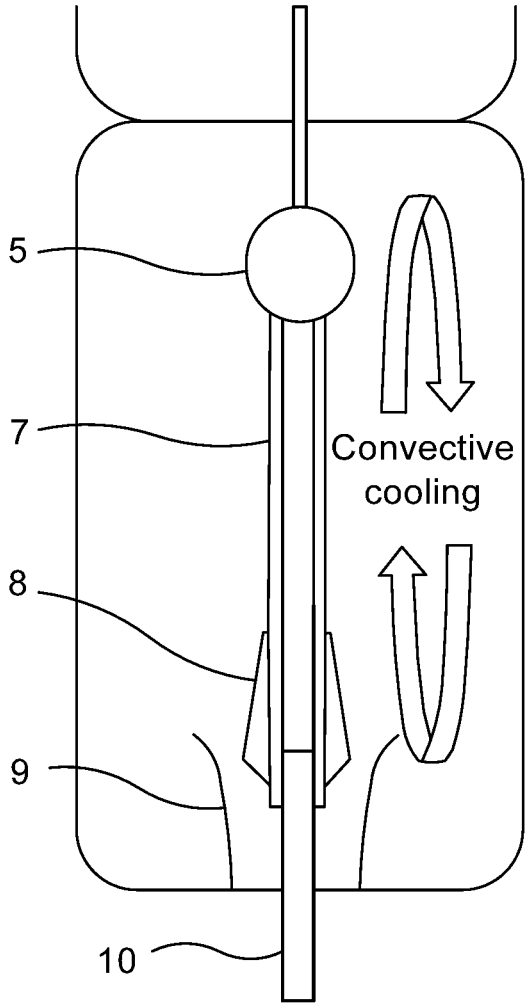
FIG. 7 illustrates an embodiment of the cable termination of FIG. 1.

FIG. 7 illustrates an embodiment of the present disclosure. In this embodiment, the inner shell 6 is omitted. The electric stress grading system 11 used in this embodiment may be designed in accordance with any of the described embodiments, i.e. comprising at least the FGM layer 7, and optionally also one or both of the stress cone 8 and the conducting electrode 9. Such embodiments may provide still improved thermal performance. Typically, a cable system, including accessories (electric field grading system etc.), is designed to operate close to the limit of any available cooling. Local hotspots caused by heated gas or oil may thus trigger an electric breakdown. Ideally, the accessories should be designed more conservatively than the power cable 10 in order to obtain optimal power transmission, since the power cable 10 is most often designed to operate close to its thermal limits. By omitting the inner shell 6, the smaller gas volume inside the inner shell 6 is removed and a further improved convective cooling of the power cable 10 is enabled by this embodiment. The cable termination part is, in this embodiment, located within a larger volume, which permits a larger gas volume to circulate more freely and the convective cooling of the power cable 10 is improved further.

Furthermore, the embodiment of FIG. 7 also eliminates two interfaces, in particular the interface between the gas and the outside of the inner shell 6, and the interface between the inside of the inner shell 6 and the gas. There is a risk of interfacial breakdown at both these interfaces, which risk is thus eliminated by the present embodiment. This embodiment provides a cost-efficient solution; the cost of the inner shell 6, e.g. made of composite isolant, is avoided, and the reduced complexity provides further cost savings by enabling an easier installation and also weight reduction.

There are several DC specific unique phenomenon, for example polarization phenomenon, the charge build-up at electrical interfaces of the cable termination, electrical charges moving within the DC field, gas moving and thus moving electrical charges. The various embodiments overcome such difficulties relating to the DC specific phenomenon involved when developing HVDC GIS cable terminations: electrical, thermal as well as mechanical difficulties.

The various features of the embodiments described may be combined in different ways, also in ways not explicitly mentioned herein. A power cable termination device 3 for a high-voltage direct current gas-insulated switchgear 1 is thus provided. The power cable termination device 3 comprises an outer housing 4 made of an electrically conducting material. The outer housing 4 is fixedly connectable at a first end thereof to a gas-insulated switchgear system 2 of the high-voltage direct current gas-insulated switchgear 1.

The power cable termination device 3 comprises a terminal portion of a power cable 10. The power cable 10 comprises an electrical conductor 101, an electrically insulating layer 103 circumferentially surrounding the electrical conductor 101, and a conductive shield 104 circumferentially surrounding the insulating layer 103 and the electrical conductor 101, wherein the conductive shield 104 is stripped off along a first part of the power cable 10.

The power cable termination device 3 comprises an electric field grading system 11 comprising a resistive field grading material layer 7 arranged circumferentially around the power cable 10 such as to extend axially at least along a part of the electrically insulating layer 103 and such as to cover at least part of the first part of the power cable 10 and to cover the edge of the conductive shield 104 where the conductive shield 104 is terminated, the resistive field grading material layer 7 being in electrical contact therewith.

The power cable termination device 3 comprises a connection device 5 connectable to the gas-insulated switchgear system 2 and arranged to provide mechanical support and electrical contact with the gas-insulated switchgear system 2.

The present disclosure also encompasses a high-voltage direct current gas-insulated switchgear system 2 comprising the high-voltage direct current gas-insulated switchgear 1 and a power cable termination device 3 as has described in various embodiments.

The invention has mainly been described herein with reference to various embodiments. However, as is appreciated by a person skilled in the art, other embodiments than the particular ones disclosed herein are equally possible within the scope of the invention, as defined by the appended patent claims.

The invention claimed is:

1. A power cable termination device for a high voltage direct current gas-insulated switchgear, the power cable termination device comprising:

an outer housing made of an electrically conducting material, the outer housing being fixedly connectable at a first end thereof to the high-voltage direct current gas-insulated switchgear, a terminal portion of a power cable, the power cable comprising an electrical conductor, an electrically insulating layer circumferentially surrounding the electrical conductor, and a conductive shield circumferentially surrounding the insulating layer and the electrical conductor, wherein the conductive shield is stripped off along a first part of the power cable, an electric field grading system comprising a resistive field grading material layer, which is made of a non-linear resistive field grading material, *the resistive field grading material layer being* arranged circumferentially around the power cable such as to extend axially at least along a part of the electrically insulating layer and such as to cover the edge of the conductive shield where the conductive shield is terminated, the resistive field grading material layer being in electrical contact therewith, [and]

a connection device connectable to the gas-insulated switchgear and arranged to provide mechanical support and electrical contact with the gas-insulated switchgear, *and*

[wherein the outer housing is filled with an insulating medium in the form of a gas]

*an inner shell made of an electrically insulating material and fastened at a first end thereof to the connection device and at a second end thereof to a power cable receiving part of the outer housing, wherein the inner shell is fastened at the first end thereof to the connection device via a first metal plate, and wherein the inner shell is fastened at the second end thereof to the outer housing via a second metal plate.*

2. The power cable termination device as claimed in claim 1, wherein the electric field grading system comprises an electric field control member arranged circumferentially surrounding the resistive field grading material layer at least along a part thereof, the electric field control member being arranged to control electrical field.

3. The power cable termination device as claimed in claim 2, wherein the electric field control member comprises a resistive field grading material.

4. The power cable termination device as claimed in claim 3, wherein the resistive field grading material of the electric field control member and the resistive field grading material of the resistive field grading material layer is a non-linear resistive field grading material.

5. The power cable termination device as claimed in claim 1, wherein the housing comprises a ground for being grounded in use.

[6. A power cable termination device for a high voltage direct current gas-insulated switchgear, the power cable termination device comprising:

an outer housing made of an electrically conducting material, the outer housing being fixedly connectable at a first end thereof to the high-voltage direct current gas-insulated switchgear, a terminal portion of a power cable, the power cable having an electrical conductor, an electrically insulating layer circumferentially surrounding the electrical conductor, and a conductive shield circumferentially surrounding the insulating layer and the electrical conductor, wherein the conductive shield is stripped off along a first part of the power cable, an electric field grading system having a resistive field grading material layer, which is made of a non-linear resistive field grading material, arranged circumferentially around the power cable such as to extend axially at least along a part of the electrically insulating layer and such as to cover the edge of the conductive shield where the conductive shield is terminated, the resistive field grading material layer being in electrical contact therewith, a connection device connectable to the gas-insulated switchgear and arranged to provide mechanical support and electrical contact with the gas-insulated switchgear, and an inner shell made of an electrically insulating material and fastened at a first end thereof to the connection device and at a second end thereof to a power cable receiving part of the outer housing.]

[7. The power cable termination device as claimed in claim 6, wherein the inner shell is fastened at the first end thereof to the connection device via a first metal plate, and wherein the inner shell is fastened at the second end thereof to the outer housing via a second metal plate.]

8. The power cable termination device as claimed in claim [7] *1*, wherein the first metal plate and the second metal plate [comprises] *comprise* a number of holes, through which an insulating medium can pass.

9. The power cable termination device as claimed in claim [6] *1*, wherein the inner shell comprises a number of holes.

10. [A] *The* power cable termination device [for a high voltage direct current gas-insulated switchgear, the power cable termination device comprising:

an outer housing made of an electrically conducting material, the outer housing being fixedly connectable at a first end thereof to the high-voltage direct current gas-insulated switchgear, a terminal portion of a power cable, the power cable comprising an electrical conductor, an electrically insulating layer circumferentially surrounding the electrical conductor, and a conductive shield circumferentially surrounding the insulating layer and the electrical conductor, wherein the conductive shield is stripped off along a first part of the power cable, an electric field grading system comprising a resistive field grading material layer, which is made of a non-linear resistive field grading material, arranged circumferentially around the power cable such as to extend axially at least along a part of the electrically insulating layer and such as to cover the edge of the conductive shield where the conductive shield is terminated, the resistive field grading material layer being in electrical contact therewith, and a connection device connectable to the gas-insulated switchgear and arranged to provide mechanical support and electrical contact with the gas-insulated switchgear,] *as claimed in claim 1* wherein the electric field grading system comprises a conducting electrode fastened to a second end of the outer housing circumferentially surrounding the power cable and arranged a distance from the resistive field grading material layer.

11. A high-voltage direct current gas-insulated switchgear system comprising a high-voltage direct current gas-insulated switchgear and a power cable termination device including:

an outer housing made of an electrically conducting material, the outer housing being fixedly connectable at a first end thereof to the high-voltage direct current gas-insulated switchgear, a terminal portion of a power cable, the power cable comprising an electrical conductor, an electrically insulating layer circumferentially surrounding the electrical conductor, and a conductive shield circumferentially surrounding the insulating layer and the electrical conductor, wherein the conductive shield is stripped off along a first part of the power cable, an electric field grading system comprising a resistive field grading material layer, which is made of a non-linear resistive field grading material, *the resistive field grading material layer being* arranged circumferentially around the power cable such as to extend axially at least along a part of the electrically insulating layer and such as to cover the edge of the conductive shield where the conductive shield is terminated, the resistive field grading material layer being in electrical contact therewith, [and]

a connection device connectable to the gas-insulated switchgear and arranged to provide mechanical support and electrical contact with the gas-insulated switchgear, *and*

[wherein the outer housing is filled with an insulating medium in the form of a gas]

*an inner shell made of an electrically insulating material and fastened at a first end thereof to the connection device and at a second end thereof to a power cable receiving part of the outer housing, wherein the inner shell is fastened at the first end thereof to the connection device via a first metal plate, and wherein the inner shell is fastened at the second end thereof to the outer housing via a second metal plate.*

*12. The high-voltage direct current gas-insulated switchgear system as claimed in claim 11, wherein the outer housing is filled with an insulating medium in the form of a gas.*

*13. The power cable termination device as claimed in claim 1, wherein the outer housing is filled with an insulating medium in the form of a gas.*

* * * * *